(12) United States Patent
Ratakonda et al.

(10) Patent No.: US 8,467,447 B2
(45) Date of Patent: Jun. 18, 2013

(54) METHOD AND APPARATUS TO DETERMINE PREDICTION MODES TO ACHIEVE FAST VIDEO ENCODING

(75) Inventors: Krishna C. Ratakonda, Yorktown Heights, NY (US); Ashish Jagmohan, Champaign, IL (US)

(73) Assignee: International Business Machines Corporation, Armonk, NY (US)

(*) Notice: Subject to any disclaimer, the term of this patent is extended or adjusted under 35 U.S.C. 154(b) by 3210 days.

(21) Appl. No.: 10/840,403

(22) Filed: May 7, 2004

(65) Prior Publication Data

US 2005/0249277 A1   Nov. 10, 2005

(51) Int. Cl.
*H04N 7/12* (2006.01)

(52) U.S. Cl.
USPC ............ 375/240.03; 375/240.01; 375/240.02; 375/240.04; 375/240.05; 375/240.08; 375/240.1; 375/240.12; 375/240.2; 375/240.24

(58) Field of Classification Search
USPC ............... 375/240.01–240.05, 240.08, 240.1, 375/240.12, 240.2, 240.24
See application file for complete search history.

(56) References Cited

U.S. PATENT DOCUMENTS

| | | | |
|---|---|---|---|
| 5,422,963 A * | 6/1995 | Chen et al. | 382/232 |
| 5,608,458 A * | 3/1997 | Chen et al. | 375/240.14 |
| 5,859,668 A | 1/1999 | Aono et al. | |
| 6,263,024 B1 * | 7/2001 | Matsumoto | 375/240.16 |
| 6,404,813 B1 | 6/2002 | Haskell et al. | |
| 6,442,204 B1 | 8/2002 | Snook et al. | |
| 6,483,876 B1 | 11/2002 | Chang et al. | |
| 6,690,836 B2 * | 2/2004 | Natarajan et al. | 382/250 |
| 2002/0126752 A1 | 9/2002 | Kim | |
| 2002/0196854 A1 | 12/2002 | Kim | |
| 2003/0053543 A1 | 3/2003 | Bhaumik et al. | |
| 2003/0099292 A1 | 5/2003 | Wang et al. | |
| 2003/0206594 A1 | 11/2003 | Zhou | |
| 2003/0223645 A1 | 12/2003 | Sun et al. | |
| 2004/0017951 A1 | 1/2004 | Koto et al. | |
| 2005/0276323 A1 * | 12/2005 | Martemyanov et al. | 375/240.03 |

* cited by examiner

*Primary Examiner* — Sath V Perungavoor
*Assistant Examiner* — Geepy Pe
(74) *Attorney, Agent, or Firm* — Daniel P. Morris (57) ABSTRACT

An improvement to a predictive video encoding method or apparatus that includes selecting a mode class within which to choose an encoding algorithm to encode individual blocks of video information. Rather than implementing each algorithm in each mode class to ascertain an acceptable compression, the improvement eliminates searching through a class of encoding modes based simply on heuristics. The method comprises obtaining statistical information related to previous blocks of encoded video information, determining a mode class within which to chose a particular encoding algorithm based on the statistical information (e.g., heuristics) gathered, choosing an algorithm within the selected mode class using conventional techniques, and encoding the video information according to the chosen algorithm. Statistical information may include quantization parameters, prior encoding decisions, intensity or frequency values, or Hadamard transform coefficients of previously encoded macroblocks. Encoding complexity in the coder is reduced since one class of encoding modes is eliminated.

24 Claims, 6 Drawing Sheets

METHOD AND APPARATUS TO DETERMINE PREDICTION MODES TO ACHIEVE FAST VIDEO ENCODING

BACKGROUND

The present invention relates to digital video encoding, but more specifically to a method and an apparatus to determine in real time an appropriate prediction mode to be implemented for successive blocks of video information.

Digital video encoding entails converting a video stream representing a sequence of frames into a compressed format for efficient storage or transmission while incurring an insignificant loss in video quality. In conventional compression methods, frames are segmented into macroblocks of n×n pixels (n is typically 16) so that the compression algorithm may compress the macroblocks individually or with reference to one or more previously encoded macroblocks. A typical encoder uses previously encoded blocks to derive a prediction value for a current block or macroblock. As such, a difference signal generated by subtracting the prediction value from a current macroblock is encoded using known compression techniques, such as variable length or arithmetic coding.

Current techniques seek to determine an optimum encoding mode among many to generate a predictor that yields a desired performance. The best or optimum encoding mode is then chosen to generate the predictor. For a given macroblock, however, not every mode choice yields acceptable compression performance. Thus, an effective implementation of a video coder also requires searching through "mode space" that includes many prediction modes and then coding the video block using each encoding mode in order to find the best compression algorithm.

A naïve but time-consuming scheme to search mode space involves generating a plurality of possible predictors, using each predictor to generate corresponding difference signals, encoding the video information with the difference signals, and then choosing the mode or algorithm that yields the best trade-off between image quality and compression ratio. Given the hardware available to implement present day video coding standards, such a scheme would be prohibitively complex and difficult to achieve in real time.

Practical encoders reduce mode search complexity by (a) computing an approximation of rather than an actual prediction error, (b) selecting a coding mode based on a function of the prediction error rather than compression performance, and/or (c) computing full compression performance only for a sub-set of modes and then using a function of the prediction error to differentiate between the rest. Implementations specified by, for example, the advanced video coder (AVC) of the Joint Video Team (JVT) and MPEG-1/2/4 use prediction error approximations to determine an appropriate prediction mode.

Figure 1:
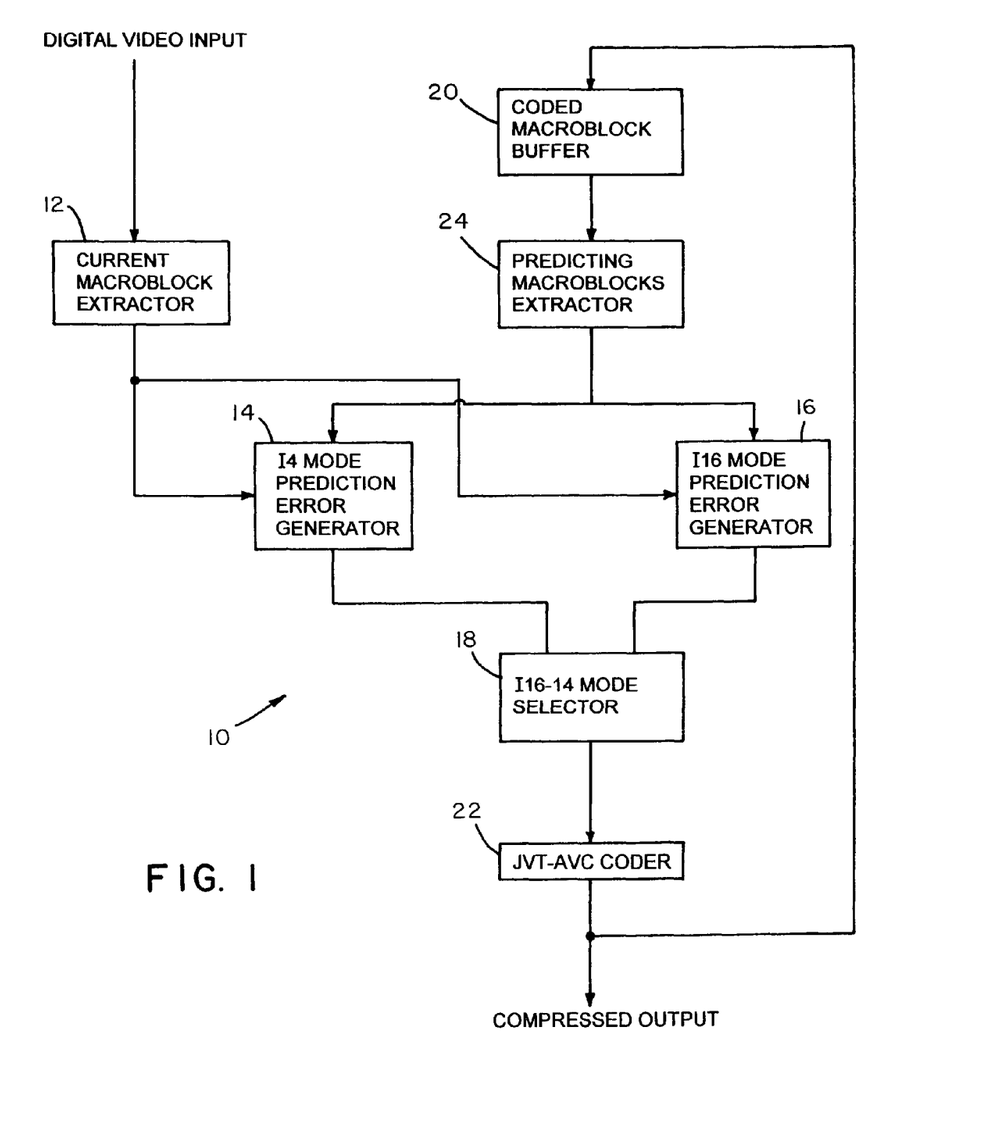
FIG. 1 shows a JVT-AVC mode selection scheme that provides selection of an encoding block size from a plurality of choices.

FIG. 1 shows a system block diagram of a JVT-AVC encoder 10 that selects a particular encoding block size from a plurality of choices to encode a digital video. The JVT-AVC standard, i.e., H.264/AVC, uses a mode space selection scheme that includes choosing to generate the prediction error for a macroblock as a single unit (i.e., a 16×16 prediction mode class) or to generate the prediction errors of smaller 4×4 sub-blocks (i.e., a 4×4 prediction mode class). Each mode class under the standard comprises several prediction modes. There are four choices of prediction modes in the 16×16 prediction mode class and nine choices of prediction modes in the 4×4 prediction mode class. Herein, the term "I16 mode" to refers to the four 16×16 modes and the term "I4 mode" refers to the nine 4×4 modes.

In the JVT-AVC mode selector of FIG. 1, macroblock extractor 12 extracts blocks of pixel information from a digital video input stream to generate either an I4 or I16 prediction error via error generators 14 or 16. Mode selector 18 determines a best prediction mode to implement based on prediction errors generated for prior blocks, as reflected in buffer 20 that receives feedback from an output stage of coder 22. Buffer 20 thus provides a source of encoded blocks from which extractor 24 may extract previously encoded macroblocks prior to forwarding the blocks to generators 14 and 16. Based on the forwarded information, generators 14 and 16 determine a prediction error for the current block by comparing or subtracting a current macroblock from a reconstructed prior macroblock.

Known implementations of selector 18 to choose a mode class include (a) generating an approximate or full evaluation of each mode class (i.e., for both the 16×16 and 4×4 mode classes); (b) selecting the best mode in each mode class; and (c) then selecting the best choice between the two mode classes.

Figure 2:
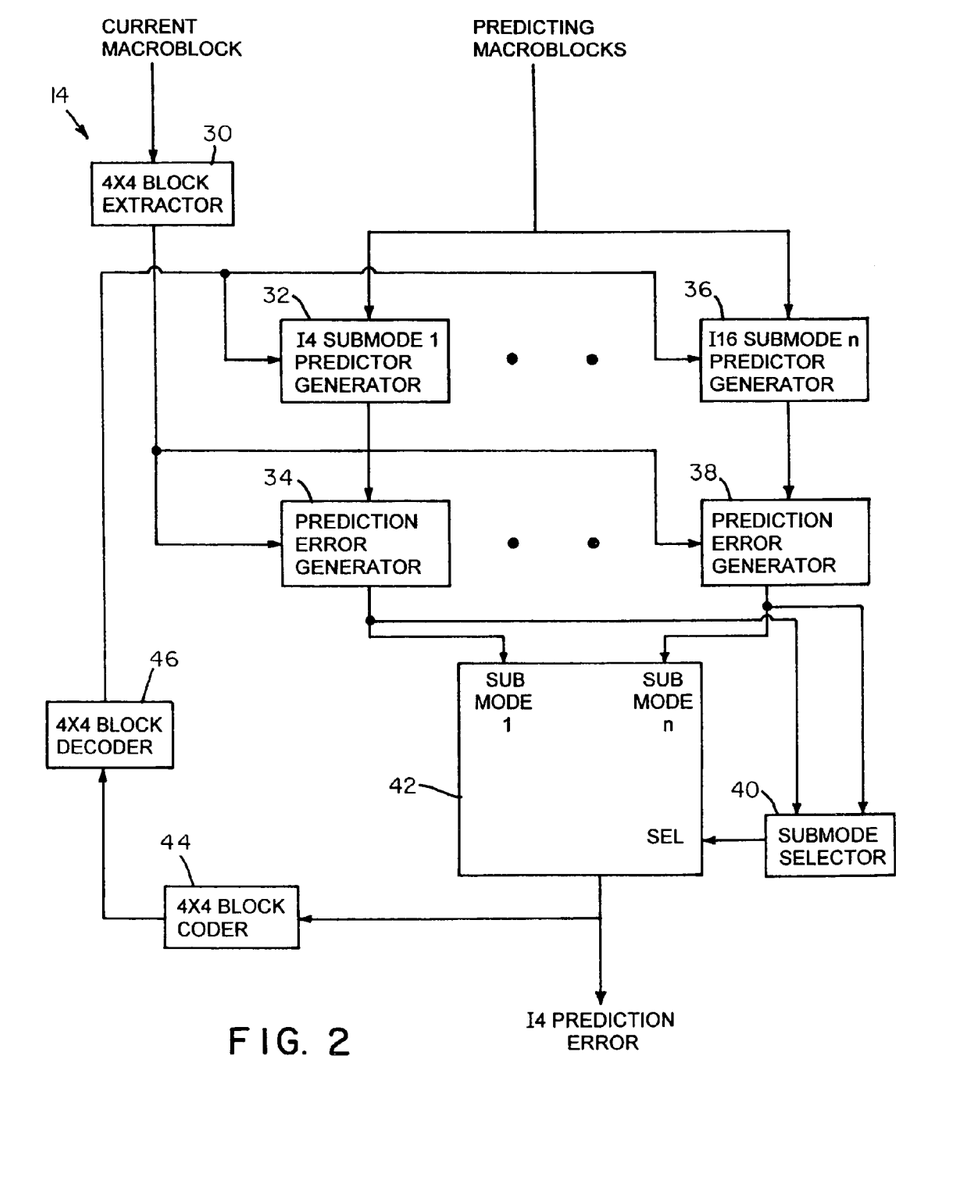
FIG. 2 illustrates the operation of the I4 Mode Prediction Error Generator shown in FIG. 1.
Figure 3:
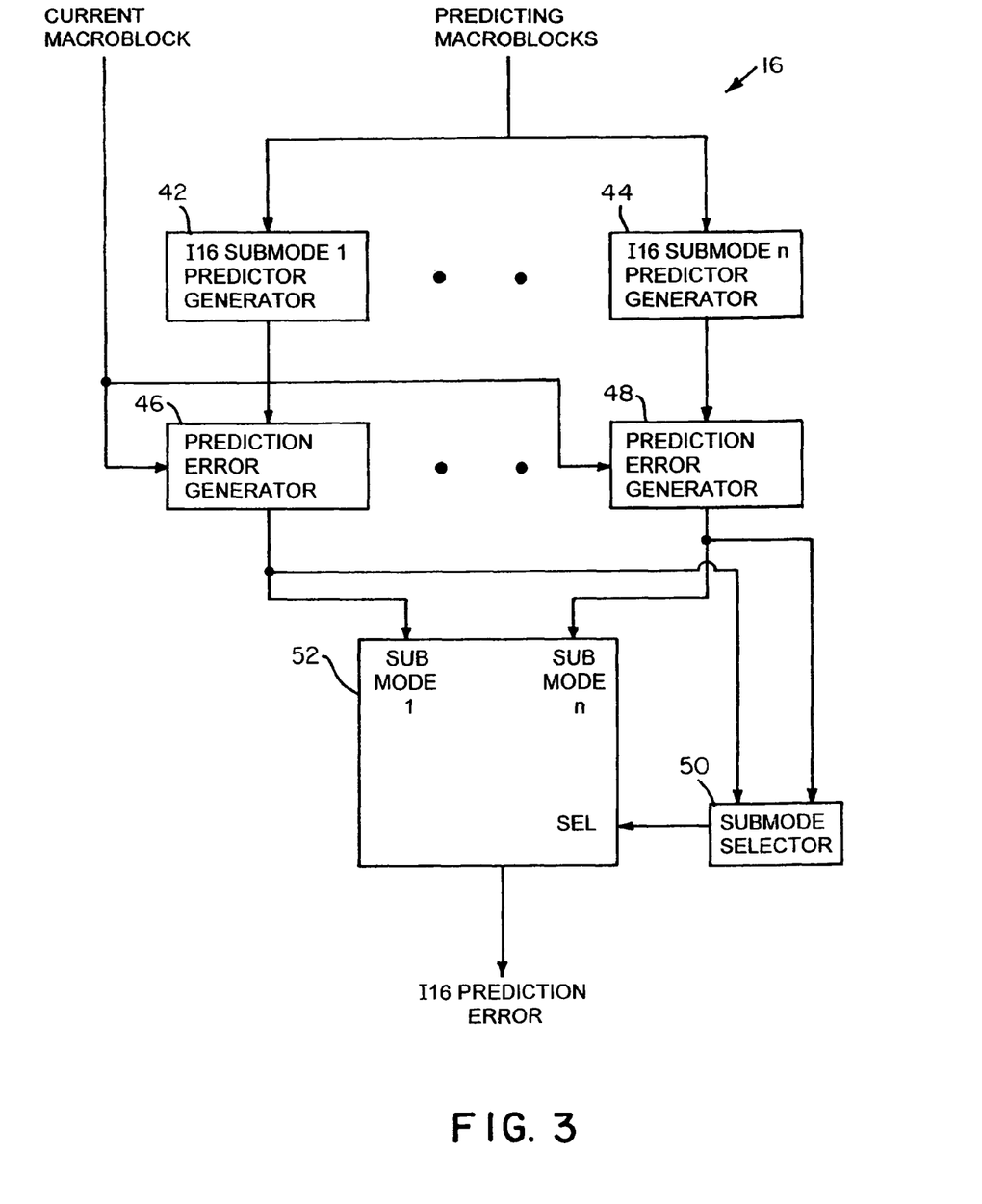
FIG. 3 illustrates the operation of the I16 Mode Prediction Error Generator shown in FIG. 1.

FIGS. 2 and 3 respectively illustrate the operation of the I4 Mode Prediction Error Generator 14 and the operation of the I16 Mode Prediction Error Generator 16 shown in FIG. 1. In each case, prediction modes in each mode class are evaluated to some degree, which adds computational complexity to the mode selection process. As shown in FIG. 2, extractor 30 of the I4 mode selector extracts a 4×4 sub-block to generate a prediction via predictor generators 32, 36 and prediction error generators 34, 38. Generators 34 and 38 produce a prediction error for a current sub-block based on sub-blocks that have been reconstructed from previously encoded sub-blocks. A submode selector 40 determines which I4 prediction error in memory block 42 to output from the coder. The output is also fed back to predictor generators 32 and 36 via the 4×4 block coder 44 and decoder 46.

The I16 mode selector 16 of FIG. 3 operates similarly where predictors from previously encoded macroblocks produced by a series of generators (generators 42 and 44 shown) are supplied to prediction error generators (generators 46 and 48 shown) to produce a prediction error for a current macroblock. Based on the prediction error generated by the generators 46, 48, submode selector 50 selects which I16 prediction error to output from memory block 52.

In all such cases, though, some or all of the prediction modes in each I4 and I16 mode class must be evaluated to some degree, which evaluation requires substantial processing time particularly since the evaluation must be carried out separately for each mode class.

Thus, it would be advantageous to reduce the computational complexity of the prior art mode selection process by reducing or eliminating the need to generate, approximate or otherwise evaluate one or more prediction errors during mode class selection.

Using heuristics directed to certain properties of the video steam, the present invention advantageously eliminates or reduces searching mode space of at least one of the mode classes. Because macroblocks having unique statistical behavior fall into different mode classes, one can examine statistical information alone or with other attributes of the video to "predict" which mode class will be better suited for compression of a current macroblock. For example, 16×16 prediction modes are better suited to compress macroblocks with little or smooth variation in pixel intensities whereas the 4×4 prediction modes are better suited to compress macroblocks with larger variations in pixel intensities. Thus, a mode class may be chosen simply by assessing variations in pixel intensity. Other statistical information may be used to determine an optimal mode class. Moreover, statistical learning may be applied to differentiate between mode classes without any recourse to computation of prediction error. Under the JVT-AVC standard, for example, the method and apparatus embodiments of the present invention was found to yield negligible loss in performance while greatly reducing the computational complexity, and hence, processor cycles, by a factor of two.

SUMMARY OF THE INVENTION

One aspect of the invention comprises an improvement to a predictive video encoding process that includes choosing a mode of encoding individual blocks or segments of video information. The improvement comprises a method of selecting a mode class within which to chose a particular mode or encoding algorithm, and includes the steps of obtaining statistical information related to the video information, determining a mode class within which to chose a particular encoding mode based on the statistical information, selecting a class of encoding modes based on the determining step, and encoding the video information according to modes of the selected mode class whereby to reduce complexity of encoding said video information.

Another aspect of the invention comprises a method of encoding video information including the steps of obtaining a block of video information under a video encoding standard; segmenting the block of video information into sub-blocks; providing a first class of encoding modes that defines encoding algorithms to encode the block; providing a second class of encoding modes that defines encoding algorithms to encode the sub-blocks; according to statistical information derived from the video information, examining the first class or said second class from which to choose an encoding algorithm to encode the video information; and encoding the video information according to the chosen algorithm determined in the examining step.

A further aspect of the invention comprises an apparatus that selects a class of encoding modes within which to choose an encoding mode to encode video information. The apparatus comprises an extractor that extracts blocks of video information from a source of digital video information under a predictive video compression standard, a statistics gatherer that obtains statistical information pertaining to at least one extracted block of video information, a mode class selector responsive to the statistics gatherer to select one of first and second mode classes from which to choose an encoding mode, and a coder responsive to the mode class selector to encode the video information according to an encoding mode in a selected one of the first and second mode classes.

A further aspect of the invention comprises an article of manufacture including computer readable program code to effect selection among two or more mode classes respectively associated with modes of encoding video information. The program code is operative to acquire statistical information related to the video information, to determine a mode class within which to chose a particular encoding mode based on the statistical information, to select a mode class of encoding modes based on the determining step, and to encode the video information according to at least one mode of the selected mode classes whereby to reduce complexity of encoding said video information.

Other aspects of the invention include obtaining statistical information related to previously encoded blocks of video information, such as frequency or intensity values of segments of video information, local intensity averages and the Hadamard transform coefficients of the intensity values of a segment of video information, encoding quantization parameters, prior encoding decisions, encoding resolution, format of the video information, pixel intensity values, pixel chroma values, or encoding block size.

Other aspects of the invention will become apparent upon review of the following description taken in conjunction with the accompanying drawings. The invention, though, is pointed out with particularity by the appended claims.

DESCRIPTION OF ILLUSTRATIVE EMBODIMENTS

The present invention advantageously reduces the amount of processing time needed to select between or among encoding mode classes in a digital video encoding method or system that employs a plurality of block sizes for encoding and/or that uses previously encoded blocks to derive a prediction for a current block being encoded. As used herein, a mode class generally includes more than one prediction mode or algorithm.

An implementation of the invention uses statistical properties of a current block and previously encoded blocks to derive a selection among two or more mode classes. Statistical properties utilized may indicate intensity and/or frequency content of one or more video blocks, or even encoding decisions made for previous blocks such as a quantization parameter used to encode prior blocks or the mode class selected in such instances. Properties that indicate or suggest an appropriate mode class may include other parameters. Several classification algorithms based on learning theories known in art may also be used to determine mode class selection to reduce computational complexity of the encoder. Heuristics can also be used to choose an appropriate mode class.

Figure 4:
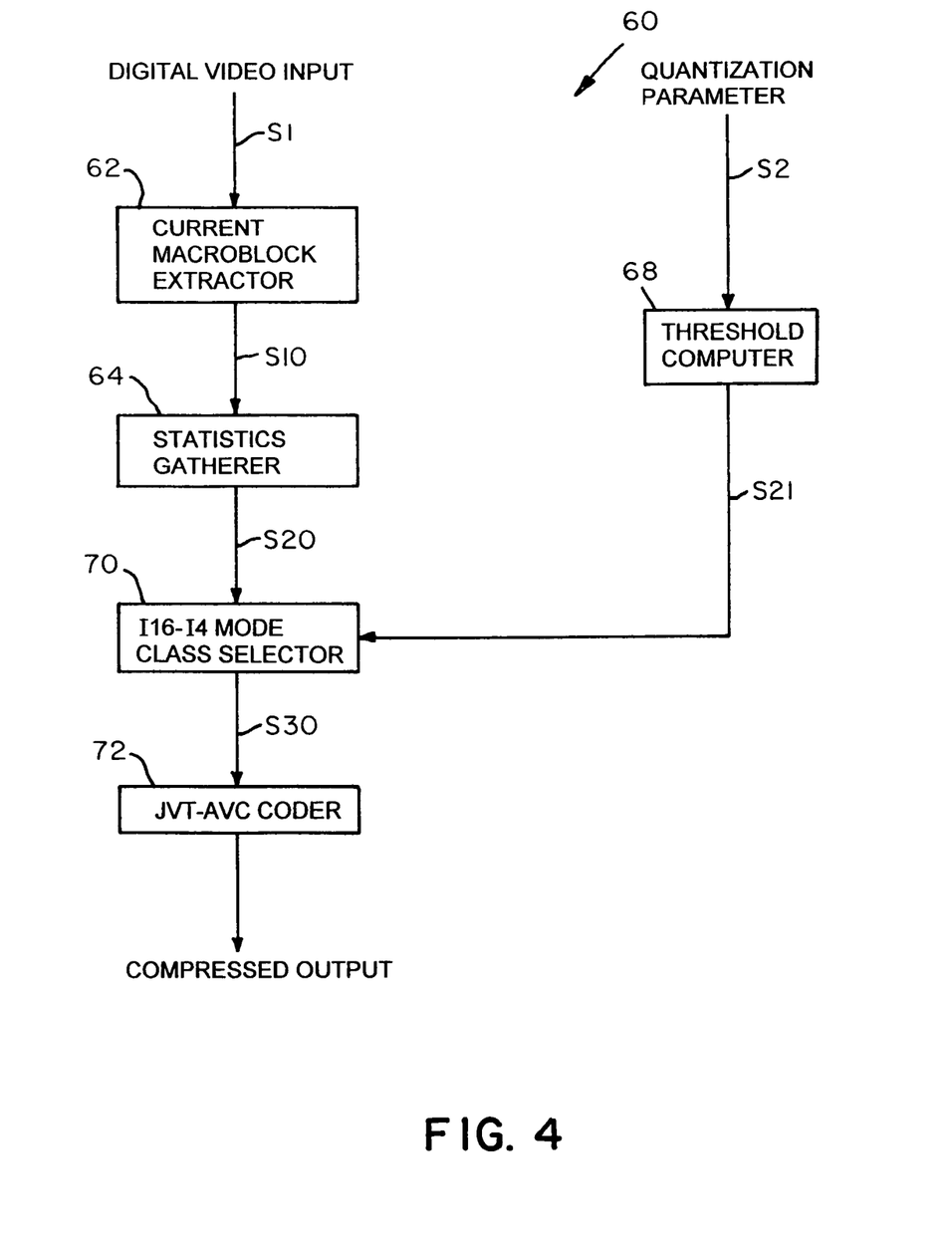
FIG. 4 is a conceptual overview of an illustrative embodiment of the present invention to select a prediction mode class to attain fast video encoding.

FIG. 4 is the conceptual overview of an encoder 60 according to an embodiment of the present invention. This embodiment selects an encoding block size for an intra-coded block or macroblock in a digital video encoder compliant with the H.264/AVC encoding standard. Such an encoder 60 requires a selection between one of two encoding block sizes, namely, a 16×16 macroblock or a series of 4×4 sub-blocks, to encode each macroblock. Herein, the term I16 mode to refers to 16×16 encoding modes whereas the term I4 mode refers to 4×4 encoding modes. In the case of an I16 mode, one encoding mode determines the type of prediction for the entire 16×16 macroblock. In the case of I4 modes, the current macroblock is subdivided into sixteen 4×4 sub-blocks, each of which is predicted according to possibly a separate 4×4 encoding mode. The illustrated embodiment uses statistics related to previously encoded macroblocks to make the selection between I4 and I16 mode classes.

In FIG. 4, extractor 62 extracts a current macroblock from input digital video information received on line S1 and outputs on line S20 the extracted macroblock to a statistics gatherer 64. Statistical gatherer 64 computes or determines statistical information, such as local intensity averages and/or Hadamard transform coefficients of macroblock pixel intensity values. Gatherer 64 outputs a signal S20 that may indicate the high frequency content of the macroblock, pixel intensities, the horizontal and vertical frequency content of the macroblock pixel intensities, and/or the Hadamard transform coefficients of macroblock pixel intensities. In an alternative embodiment, gatherer 64 derives or obtains pixel intensity values, pixel chrominance values, and/or encoding block sizes of previously encoded macroblocks, in which case the output signal S20 may include, in addition to the statistics described for this case, the Hadamard transform coefficients of the previously encoded macroblocks and the encoding modes used for the previously encoded macroblocks. As indicated, gatherer 64 may obtain or derive other statistics related to the video information.

Threshold computer 68 computes a fixed set of thresholds that are applied to mode selector 70 via signal S21. These thresholds are polynomial functions of the encoding quantization parameter supplied to the threshold computer 68 via line S2. In another embodiment, thresholds may be computed as functions of the encoding quantization parameter, the encoding resolution of the video, and the format of the input video (e.g., interlaced or progressive).

Based on information supplied by statistical gatherer 64 and threshold computer 68, I16-I4 mode class selector 70 selects the encoding mode class for the current macroblock. In particular, selector 70 uses a function of the statistics supplied by the input signal S20 and a set of threshold values supplied via input signal S21 to select the best mode class, e.g., the I4 or I16 mode class, to encode the current macroblock. The selected mode class then enables a conventional JVT-AVC coder 72 via signal S30 to choose an encoding mode within the selected class with which to encode the video. Coder 72 uses standard JVT-AVC encoding algorithms to encode the current macroblock by using the encoding modes of the selected mode class. The output of coder 72 is thus a compressed bit stream corresponding to the current macroblock.

Figure 5:
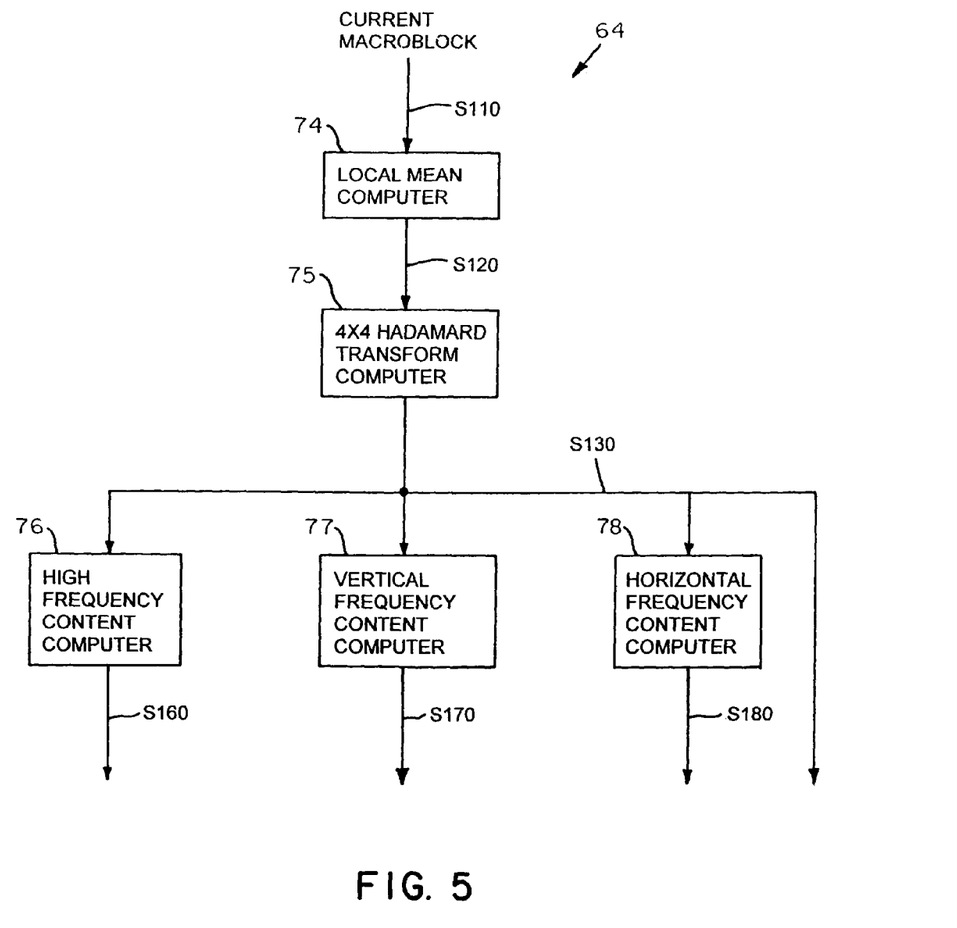
FIG. 5 illustrates the operation of the Statistics Gatherer shown in FIG. 4.

FIG. 5 shows an implementation of statistics gatherer 64 of FIG. 4. As shown, input signal S110 supplied to the statistics gatherer 64 carries current macroblock pixel intensity values. A local computer 74 partitions the input macroblock into sixteen subgroups of sixteen pixels each, and then computes local intensity averages over each subgroup. The sixteen local intensity values are represented as a 4×4 grid that is outputted as signal S120. Signal S120 is then applied to a 4×4 Hadamard transform computer 75, which computes a 4×4 Hadamard transform of the grid intensity values by pre-multiplying and post-multiplying the grid values with a 4×4 Hadamard transform matrix. A resultant 4×4 grid of transform domain coefficients is then supplied as signal S130 to high-frequency content computer 76, vertical frequency content computer 77, and horizontal frequency content computer 78. In an alternative embodiment, the transform computer 75 uses other transforms to compute the frequency domain statistics of macroblock pixel intensities. The high frequency content computer 76 computes the sum of the absolute values of coefficients in a 3×3 sub-matrix representing the high frequency transform domain coefficients and outputs the same as signal S160. The vertical frequency content computer 77 computes the sum of the absolute values of the three transform domain coefficients representing a projection of the macro-block intensities on a horizontal dc basis vector and the three non-dc vertical frequency basis vectors. The computed sum is the output as signal S170.

Horizontal frequency content computer 78 computes the sum of the absolute values of three transform domain coefficients that represent the projection of macroblock intensities on the vertical dc basis vector and the three non-dc horizontal frequency basis vectors. The computed sum is output as signal S1180. Thus, the output of statistics gatherer 64 is represented by signals S130, S160, S170, and S180.

Figure 6:
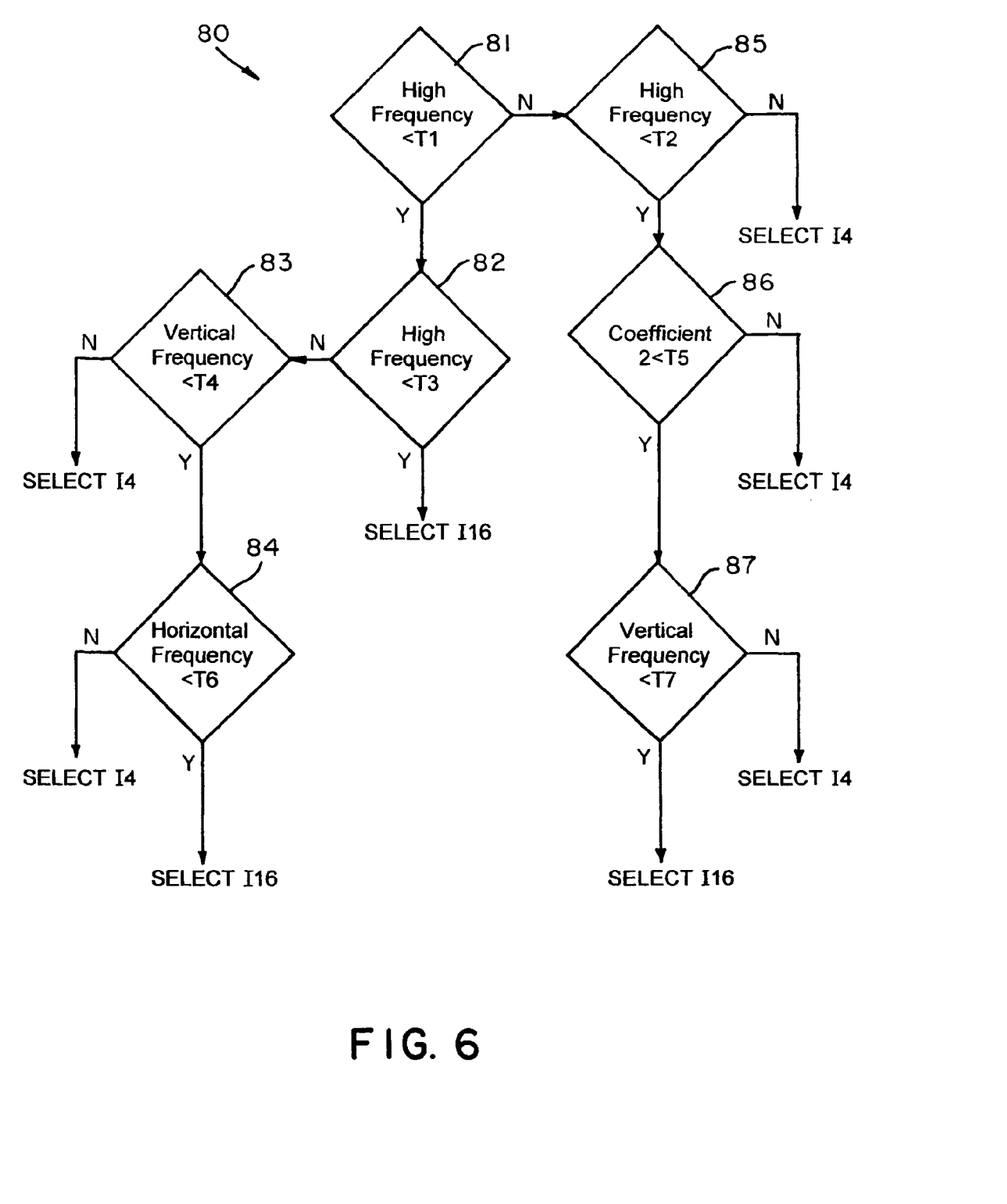
FIG. 6 illustrates a decision process implemented for the I16-I4 Mode Selector shown in FIG. 4.

FIG. 6 shows a decision process implemented by the I16-I4 mode selector 70 (FIG. 4). The decision process uses a classification tree 80 as a classifier to select one of the I4 and I16 mode classes. Classification tree 80 uses frequency statistics generated by the statistics gatherer 64 to select a mode class. Predetermined thresholds used by the classification tree, termed T1 through T7, as well as the structure of the classification tree, are determined during a training phase in which digital video sequences with known encoding modes and known properties are examined to learn the structure and properties of the video. This learning process may be performed off-line, that is, it may be performed prior to and independent of any actual or real time encoding process. Hence, the learning process does not increase the time-complexity of the encoding process.

The learning process may be performed for a plurality of values of the quantization parameter where the resultant thresholds are interpolated using polynomial regression functions. Threshold computer 68 (FIG. 4) then uses the regression functions during the encoding process to yield the classification tree thresholds T1 through T7 for the specific input quantization parameter to be used during encoding a current macroblock. In step 81 of the illustrated decision process, the high frequency is tested against threshold T1. If the high frequency is less than T1, the process branches to conditional step 82 where the high frequency is tested against threshold T3. If affirmative, the I16 mode class is selected. If negative, the decision process branches to conditional step 83 where the vertical frequency is tested against threshold T4. If negative, the I4 mode class is selected. If affirmative, the decision process branches to conditional step 84 where the horizontal frequency is tested against threshold T6. If negative, the I4 mode class is selected. If affirmative, the I16 mode class is selected.

If, at step 81, the test of the high frequency against threshold T1 produced a negative result, the decision process would have branched to conditional step 85 where the high frequency is tested against threshold T2. If negative, mode class 14 is selected. If affirmative, the decision process branches to conditional step 86 where threshold T5 is tested against the integer "2." If negative, the I4 mode class is selected. If affirmative, the decision process branches to conditional step 87 where the vertical frequency is tested against threshold T7. If negative, mode class 14 is selected. If affirmative, mode class 116 is selected. Accordingly, the decision tree operates to select one of the I4 or I16 mode classes to ascertain the most appropriate encoding mode to encode the incoming video. Once the selection is made, conventional mode space searching and/or encoding is employed to find an appropriate algorithm and encode the video but the encoding process need not implement or search through modes of the non-selected class to find an appropriate encoding mode, thereby saving substantial computational time.

Various aspects of the invention include a method, apparatus, or an article of manufacture embodying computer readable program code to effect selection of a mode class within which to choose an encoding mode. Although the disclosed embodiments show cases where broad classes of modes are classified on the basis of differing block sizes, the invention has applicability to any mode class selection process used by a video encoder. Additionally, a classifier other than a classification tree may be used to implement the mode class selection. These include a classifier utilizing statistics of a plurality of previously encoded blocks and/or known mode decisions for previously encoded blocks. Thus, the foregoing description is to be considered illustrative but not a limitation of the invention. Numerous modifications within the scope of the appended claims are apparent to those skilled in the art.

What is claimed is:

1. In a predictive video encoding method that includes choosing a mode of video encoding for individual blocks of video information wherein the mode resides in one or more classes, the improvement comprising a method of selecting a mode class within which to choose a particular mode of encoding comprising the steps of:
  obtaining statistical information related to said video information,
  determining a mode class within which to chose a particular encoding mode based on said statistical information,
  selecting a mode class of encoding modes based on said determining step, and
  encoding said video information according to at least one mode of the selected mode class whereby to reduce complexity of encoding said video information.

2. The improvement of claim 1 wherein said obtaining step comprises obtaining statistical information about at least one of frequency and intensity values of successive blocks of video information.

3. The improvement of claim 1 wherein said obtaining step includes obtaining statistical information about local intensity averages and the Hadamard transform coefficients of the intensity values of a block of video information.

4. The improvement of claim 1 wherein said obtaining step includes obtaining statistical information pertaining to encoding decisions made in previously encoded blocks of video information.

5. The improvement of claim 4 wherein said obtaining step includes obtaining information indicative of the Hadamard transform coefficients of and the encoding modes used for previously encoded segments.

6. The improvement of claim 4 wherein said obtaining step includes comparing statistical information to a fixed set of threshold values.

7. The improvement of claim 6 wherein the fixed set of thresholds comprises polynomial functions of an encoding quantization parameter.

8. The improvement of claim 7 wherein the fixed set of thresholds is a function of said encoding quantization parameter, encoding resolution of the video information, and format of said video information.

9. The improvement of claim 1, wherein the selecting is performed between I4 and I16 mode classes defined under a H.264/AVC video encoding standard.

10. A method of encoding video information comprising:
  obtaining a block of video information under a video encoding standard,
  segmenting said block of video information to sub-blocks,
  providing a first class of encoding modes that defines encoding algorithms to encode said sub-blocks,
  providing a second class of encoding modes that defines encoding algorithms to encode said sub-blocks,
  according to statistical information derived from said video information, selecting one of said first class and said second class from which to choose an encoding algorithm to encode said video information, and
  encoding said video information according to an algorithm or a class selected in said selecting step.

11. The method of claim 10, wherein said obtaining step comprises obtaining a block of video information under an H.264/AVC encoding standard.

12. The method of claim 11, wherein said statistical information of said selecting step comprises an encoding decision made for at least one previous block of video information.

13. The method of claim 12, wherein said statistical information of said selecting step comprises at least one of a quantization parameter, encoding resolution, and format used for previously encoded video information.

14. The method of claim 12, wherein said statistical information of said selecting step comprises local intensity values of pixels in a macroblock and Hadamard transform coefficients of said intensity values.

15. The method of claim 12, wherein said statistical information of said selecting step comprises a high-frequency content of pixel intensities and Hadamard transform coefficients of said intensities.

16. The method of claim 12, wherein said statistical information of said selecting step comprises at least one of pixel intensity values, pixel chroma values, and encoding block size of previously encoded blocks.

17. An apparatus that selects an encoding mode class within which to choose an encoding mode to encode video information, said apparatus comprising:
  an extractor that extract blocks of video information from a source of digital video information under a predictive video compression standard,
  a statistics gatherer that obtains statistical information pertaining to at least one extracted block of video information,
  a mode class selector responsive to said statistics gatherer to select one of first and second mode classes from which to choose an encoding mode, and
  a coder responsive to said mode class selector to encode said video information according to an encoding mode in a selected one of said first and second mode classes.

18. The apparatus of claim 17, further comprising a threshold computer to generate and apply a set of threshold values to said mode selector to determine a selection of one of said first and second mode classes.

19. The apparatus of claim 18, wherein statistics gathered by the statistics gatherer comprise statistics related to frequency and intensity of pixel information.

20. The apparatus of claim 19 wherein the statistics gathered from the video information comprise the local intensity averages and the Hadamard transform coefficients of the intensity values of the macroblock pixels.

21. The apparatus of claim 19 wherein the statistics gathered include encoding decisions made in the context of the previous blocks.

22. The apparatus of claim 19 wherein statistics gathered by said statistics gatherer includes at least one of an encoding decision made in previous blocks and Hadamard transform coefficients of previously encoded macroblocks.

23. The apparatus of claim 18 wherein the set of thresholds are polynomial functions of the encoding quantization parameter.

24. The apparatus of claim 18 wherein the set of thresholds are computed as functions of an encoding quantization parameter, an encoding resolution of the video information, and a format of the input video.

* * * * *